US007650118B2

(12) United States Patent
Hsieh et al.

(10) Patent No.: US 7,650,118 B2
(45) **Date of Patent: *Jan. 19, 2010**

(54) WIRELESS TRANSMISSION SYSTEM AND METHOD

(75) Inventors: Kuan-Hong Hsieh, Shenzhen (CN); Wen-Chuan Lian, Shenzhen (CN); Shin-Hong Chung, Shenzhen (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 603 days.

This patent is subject to a terminal disclaimer.

(21) Appl. No.: 11/309,523

(22) Filed: Aug. 17, 2006

(65) Prior Publication Data

US 2007/0087683 A1 Apr. 19, 2007

(30) Foreign Application Priority Data

Oct. 14, 2005 (TW) .............................. 94136040 A

(51) Int. Cl.
*H04B 15/00* (2006.01)

(52) U.S. Cl. ...................... 455/63.3; 455/114.2; 455/42

(58) Field of Classification Search ................. 455/120, 455/123, 125
See application file for complete search history.

(56) References Cited

U.S. PATENT DOCUMENTS

| | | | | | |
|---|---|---|---|---|---|
| 5,970,390 | A | | 10/1999 | Koga et al. | |
| 7,529,530 | B2 | * | 5/2009 | Li et al. | 455/185.1 |
| 2003/0060219 | A1 | * | 3/2003 | Parsiokas | 455/501 |
| 2004/0117442 | A1 | * | 6/2004 | Thielen | 709/203 |
| 2006/0223467 | A1 | * | 10/2006 | Mason | 455/185.1 |

* cited by examiner

*Primary Examiner*—Matthew D Anderson
*Assistant Examiner*—Gennadiy Tsvey
(74) *Attorney, Agent, or Firm*—Winston Hsu

(57) ABSTRACT

A wireless transmission system is provided. The system includes a wireless transmission apparatus for sending radio signals in a selected frequency and a wireless reception apparatus for receiving the radio signals in the selected frequency and playing audio signals corresponding to the radio signals. The wireless transmission apparatus includes a scan unit for periodically scanning interference frequencies of candidate frequencies, and recording characteristics of each interference frequency; an evaluation value calculating module for calculating an evaluation value of each candidate frequency according to the characteristics of the corresponding interference frequencies; a frequency selection module for choosing one of the candidate frequencies as a current transmission frequency according to the evaluation values; and a transmission unit for sending radio signals in the current transmission frequency. A wireless transmission method is also provided.

9 Claims, 5 Drawing Sheets

WIRELESS TRANSMISSION SYSTEM AND METHOD

TECHNICAL FIELD

The present invention relates generally to wireless transmission systems and methods, and particularly to a wireless transmission system and method that can select a transmission frequency automatically.

GENERAL BACKGROUND

There are a number of systems that use existing radio receivers in automobiles to playback audio signals from a compact disc (CD) player, tape cassette player, satellite broadcast receiver, or other auxiliary audio sources.

In these systems, it is required to set the reception frequency of the installed radio receiver to a specific frequency of the frequency modulation (FM) broadcasting band where no FM programs are broadcasted, namely an empty frequency or an unused frequency. Next, the transmission frequency of the electronic entertainment device must be tuned to the reception frequency of the radio receiver. However, such tuning operations require very cumbersome manipulations. In particular, very cumbersome and heavy workloads are necessary so as to scan for the empty frequency in such a frequency band where a large number of FM programs are broadcasted.

To solve such problem, special systems are capable of automatically selecting an empty or unused frequency within an FM broadcasting band, and to transmit the FM signals at this empty frequency. For example, one kind of special systems automatically detects an unused frequency within the FM broadcasting band and sets a transmission frequency and a reception frequency to the detected empty or unused frequency, and also further displays the transmission frequency.

However, because the empty or unused frequency varies at different location, I.e., when an automobile implemented with the wireless transmission system moves from a municipal area to another municipal area, the empty or unused frequency may be interfered by a local broadcasting station, which results in poor transmitted FM signals.

Thus, an improved wireless transmission system and method which automatically selects the transmission frequency when the FM signals is interfered is needed in order to ensure a non-interfered transmitted FM signals.

SUMMARY

A wireless transmission system is provided. The system includes a wireless transmission apparatus for sending radio signals in a selected frequency and a wireless reception apparatus for receiving the radio signals in the selected frequency and playing audio signals corresponding to the radio signals. The wireless transmission apparatus includes a scan unit for periodically scanning interference frequencies of candidate frequencies, and recording characteristics of each interference frequency; an evaluation value calculating module for calculating an evaluation value of each candidate frequency according to the characteristics of the corresponding interference frequencies; a frequency selection module for choosing one of the candidate frequencies as a current transmission frequency according to the evaluation values; and a transmission unit for sending radio signals in the current transmission frequency.

A wireless transmitting method is also provided. The method includes the steps of: (a) periodically scanning interference frequencies of candidate frequencies, and recording characteristics of each interference frequency; (b) calculating an evaluation value of each candidate frequency according to the characteristics of the corresponding interference frequencies; (c) choosing one of the candidate frequencies as a current transmission frequency according to the evaluation value; and (d) sending radio signals in the current transmission frequency.

An electronic entertainment device is further provided. The device includes a scan unit for periodically scanning interference frequencies of candidate frequencies, and recording characteristics of each interference frequency; an evaluation value calculating module for calculating an evaluation value of each candidate frequency according to the characteristics of the corresponding interference frequencies; a frequency selection module for choosing one of the candidate frequencies as a current transmission frequency according to the evaluation values; and a transmission unit for sending radio signals in the transmission frequency.

Other advantages and novel features will be drawn from the following detailed description of the embodiments with reference to the attached drawings, in which:

DETAILED DESCRIPTION OF THE PREFERRED EMBODIMENT

Figure 1:
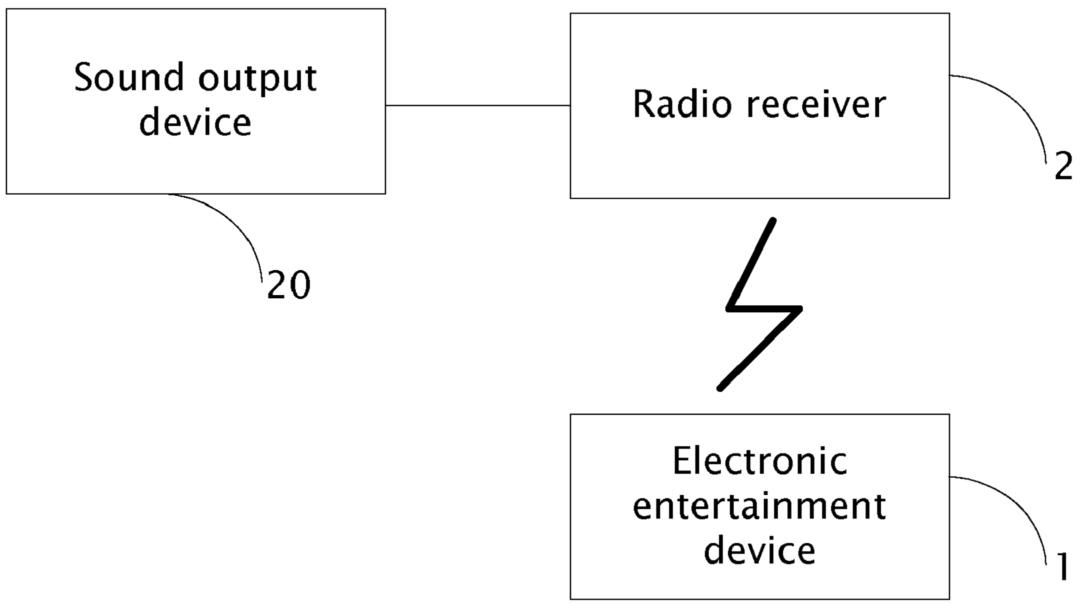
FIG. 1 is an application environment diagram of a wireless transmission system in accordance with a preferred embodiment of the present invention.

FIG. 1 is an application environment diagram of a wireless transmission system in accordance with a preferred embodiment of the present invention. The wireless transmission system includes an electronic entertainment device 1, a radio receiver 2, and a sound output device 20. The electronic entertainment device 1 and the radio receiver 2 are configured in an automobile, and are connected to each other via a wireless link. The radio receiver 2 and the sound output device 20 are also connected with each other. The electronic entertainment device 1 transforms audio signals into radio signals, and transmits the radio signals to the radio receiver 2 in a selected frequency. The radio receiver 2 automatically tunes to the selected frequency so as to receive the radio signals. The radio receiver 2 transforms the radio signals into the audio signals. The sound output device 20 may be a speaker, or the like.

Figure 2:
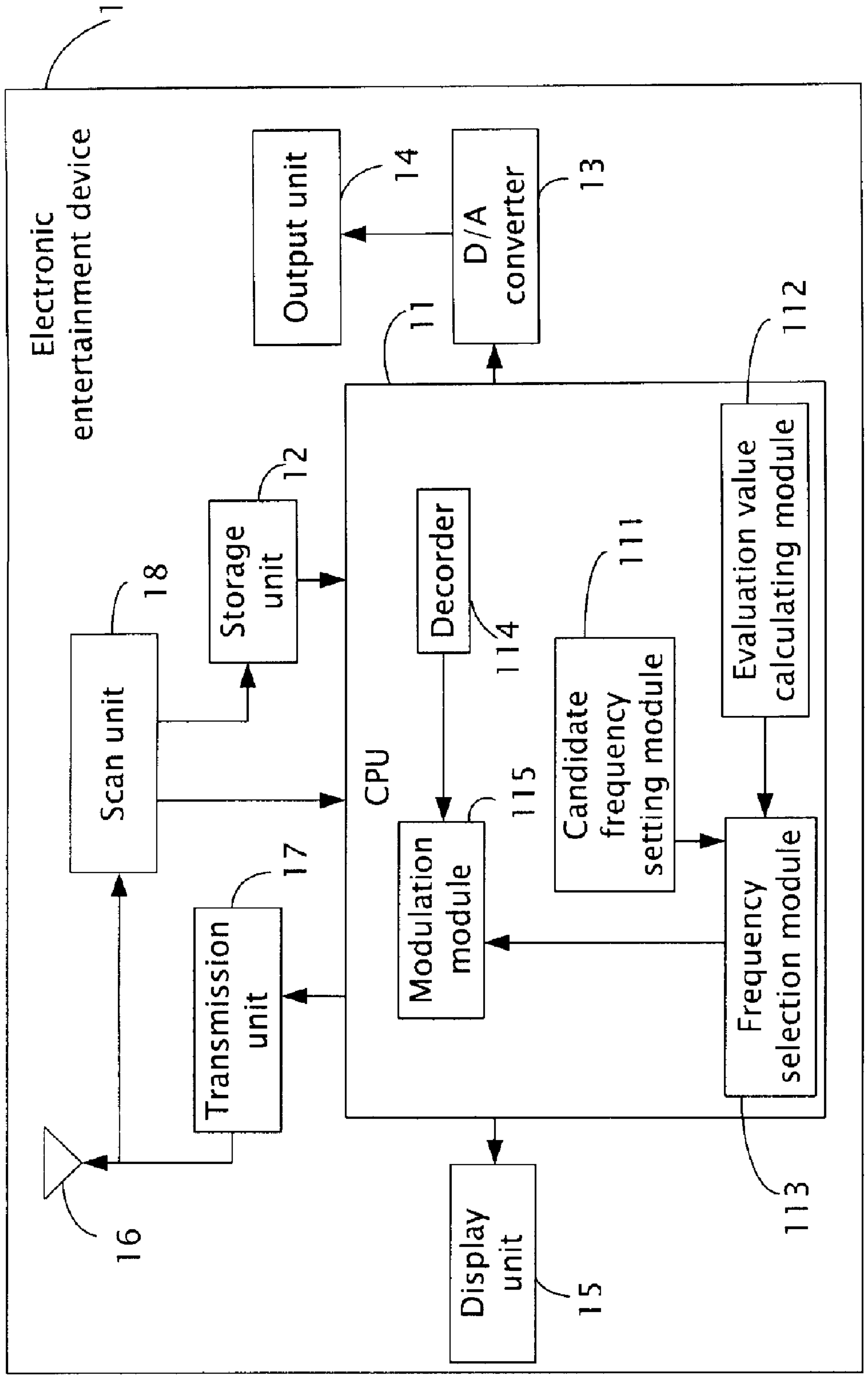
FIG. 2 is a block diagram of an electronic entertainment device of the system of FIG. 1.

FIG. 2 is a block diagram of the electronic entertainment device of the wireless transmission system of FIG. 1. The electronic entertainment device 1 mainly includes a central processing unit (CPU) 11. The CPU 11 is connected to a storage unit 12. The storage unit 12 stores audio files. The audio files can be in a moving picture expert group layer 3 (MP3) format, a windows media audio (WMA) format, and so forth. The CPU 11 reads audio files from the storage unit 12, and decodes the audio files into digital audio signals. The CPU 11 is also connected to a digital/analog (D/A) converter 13. The D/A converter 13 converts the digital audio signals into analog audio signals, and outputs the analog audio signals via an output unit 14. The CPU 11 is further connected to a display unit 15. The display unit 15 displays information when the electronic entertainment device 1 operates. The information may have different contents corresponding to different operation states of the electronic entertainment device 1. Specifically, the information includes the content related to audio signals currently played by the electronic entertainment device 1; the information includes a frequency currently selected and used by the electronic entertainment device 1 to transmit radio signals to the radio receiver 2.

The electronic entertainment device 1 further includes an antenna 16, a transmission unit 17, and a scan unit 18. The antenna 16 is used for receiving radio signals from an external radio signal outputting device such as, a satellite radio station, or alternatively, for transmitting the radio signals from the transmission unit 17 to the radio receiver 2 in a selected frequency. The scan unit 18 is connected with the antenna 16 and the storage unit 12, and is used for periodically scanning interference frequencies (symbolically depicted as a $A_{n'}$; wherein "$_{n'}$" represents an identification (ID) number of the interference frequency) within a predetermined range enclosing each candidate frequency (symbolically depicted as a character $P_n$, wherein "$_n$" represents an identification (ID) number of the candidate frequency), obtaining characteristics of each interference frequency, and storing the characteristics of each interference frequency in the storage unit 12. The characteristics of each interference frequency include a signal level (symbolically depicted as a character "$V_{n't}$", wherein t represents a scan period) and a frequency thereof.

The candidate frequencies are selectable to carry radio signals and are chosen in advance by a user. The selected frequency used by the electronic entertainment device 1 for transmitting the radio signals is one of the candidate frequencies. When the electronic entertainment device 1 is turned on, one of the candidate frequencies $P_n$ is chosen as a current transmission frequency (hereafter, "the preset transmission frequency"). Alternatively, a previous transmission frequency last used is chosen as the current transmission frequency. In the preferred embodiment, when the electronic entertainment device 1 stops transmitting radio signals, for example, when the electronic entertainment device 1 is turned off, all preceding scan records (i.e., the characteristics of the interference frequencies and the current transmission frequency) that are stored in the storage unit 12 except the current transmission frequency are deleted.

The CPU 11 further includes a candidate frequency setting module 111, an evaluation value calculating module 112, a frequency selection module 113, a decoder 114, and a modulation module 115. The candidate frequency setting module 111 sets one or more candidate frequencies.

The evaluation value calculating module 112 calculates an evaluation value (symbolically depicted as a character "$P_{nt}$", wherein "t" represents a scan period) of each candidate frequency $P_n$ according to the characteristics of the interference frequencies correspondingly in each scan period t. The evaluation value $P_{nt}$ of a candidate frequency $P_n$ is obtained according to an equation $P_{nt}=\Sigma Q_{n't}$, in which $Q_{n't}$ is an interference value of each interference frequency $P_n$. In addition, the interference value $Q_{n't}$ is obtained according to another equation $Q_{n't}=(V_{n't}+\Delta V^2)/D^2$, wherein "$V_{n't}$" represents a signal level in a current scan period t, "$\Delta V$" represents a level difference between a signal level $V_{n't}$ in the current scan period t and a signal level $V_{n'(t-1)}$ in the immediately preceding scan period t−1, "D" represents a frequency difference between the interference frequency $A_{n'}$ and the candidate frequency $P_n$. Consequently, the evaluation value $P_{nt}$ of the candidate frequency $P_n$ is: $P_{nt}=\Sigma Q_{n't}=\Sigma((V_{n't}+\Delta V^2)/D^2)$.

The frequency selection module 113 chooses the candidate frequency $P_n$ as the current transmission frequency according to the evaluation values $P_{nt}$. In the preferred embodiment, if the evaluation value $P_{nt}$ of the candidate frequency $P_n$ is less than or equal to a first predetermined value L and greater than a second predetermined value K, and if the evaluation values $P_{nt}$ of the candidate frequency $P_n$ in each scan period t are in an ascending order, the frequency selection module 113 chooses the candidate frequency $P_n$ as the current transmission frequency. For example, the current scan period is the fifth scan period, the evaluation value $P_{25}$ of the candidate frequency $P_2$ is less than or equal to a first predetermined value L and greater than a second predetermined value K, and the evaluation values of the candidate frequency $P_2$ in the first scan period, the second scan period, the third scan period, the fourth scan period, and the fifth scan period are respectively 0, 25, 53, 75, 84, (i.e., the evaluation values is in a ascending order), so the candidate frequency $P_2$ is chosen as the current transmission frequency.

The decoder 114 decodes the audio files in the storage unit 12 to digital audio signals. The modulation module 115 modulates the digital audio signals into radio signals in the candidate frequency chosen by the frequency selection module 113.

In the preferred embodiment, the radio receiver 2 includes a sensor (not shown). The sensor detects another frequency difference between the frequency of a radio signal received (i.e., the chosen transmission frequency $P_n$) and a local oscillation frequency of the radio receiver 2. If the frequency difference is variable, the radio receiver 2 automatically tunes a current reception frequency thereof based on the difference value, in order to clearly receive the radio signals from the electronic entertainment device 1. The current reception frequency is the same as the chosen transmission frequency $P_n$.

Figures 3A, 3B:
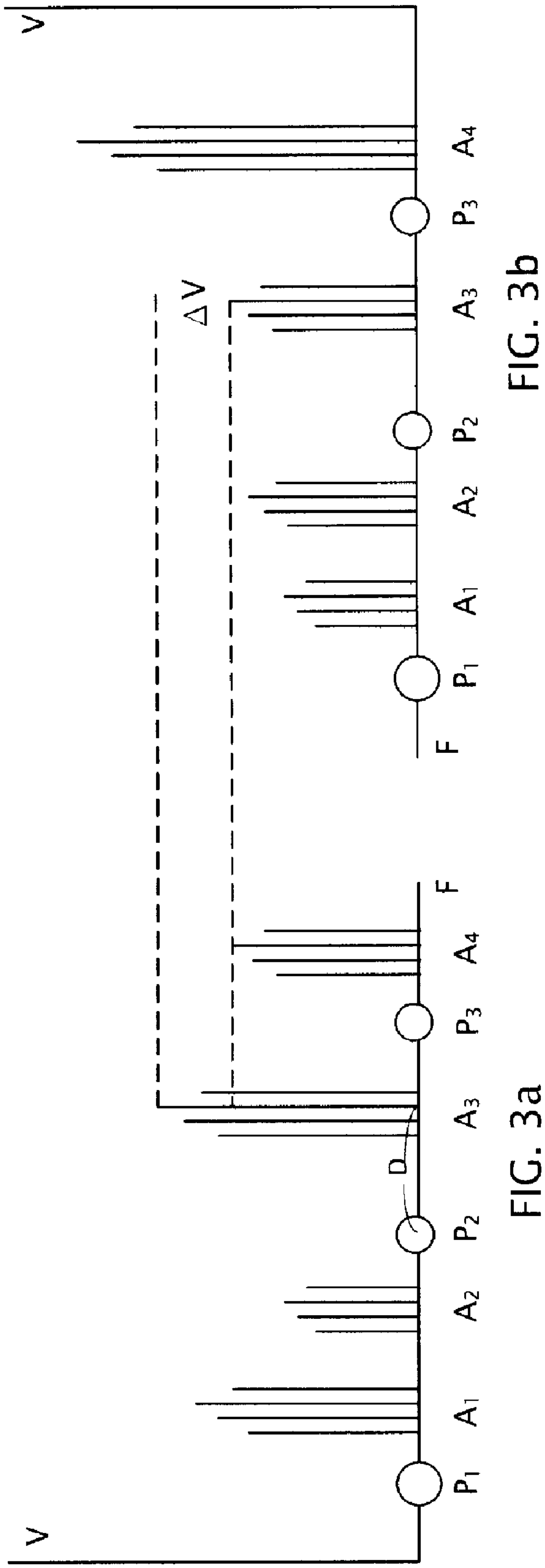
FIG. 3 is schematic diagram of interfered candidate frequencies.

FIGS. 3*a* and 3*b* are schematic diagrams each respectively showing candidate frequencies and associated interference frequencies in a first scan period (i.e. t=1) and a second scan period (t=2). The x-axis represents the frequency (abbreviated as F), and the y-axis represents the signal level $V_{n't}$. In the preferred embodiment, the candidate frequencies are $P_1$, $P_2$, and $P_3$, and the interference frequencies are respectively $A_1$, $A_2$, $A_3$, $A_4$, etc. For example, interference frequencies of the candidate frequency $P_2$ are $A_1$, $A_2$, and $A_3$ in the first scan period, interference frequencies of the candidate frequency $P_2$ are $A_2$ and $A_3$, in the second scan period, accordingly, the evaluation value $P_{22}$ of the candidate frequency $P_2$ is: $P_{nt}=\Sigma Q_{n't}=(V_{12}+(V_{12}-V_{11})^2)/(F_{P2}-F_{A1})^2+(V_{22}+(V_{22}+(V_{22}-V_{21})^2)/(F_{P2}-F_{A2})^2+((V_{32}+(V_{32}-V_{31})^2)/(F_{P2}-F_{A3})^2$, wherein the $V_{12}$ is equal to zero, because $A_1$ is not an interference frequency of the candidate frequency $P_2$ in the second period. $F_{A2})^2+((V_{32}+(V_{32}-V_{31})^2)/(F_{P2}-F_{A3})^2$, wherein the $V_{12}$ is equal to zero, because $A_1$ is not an interference frequency of the candidate frequency $P_2$ in the second period.

Figure 4:
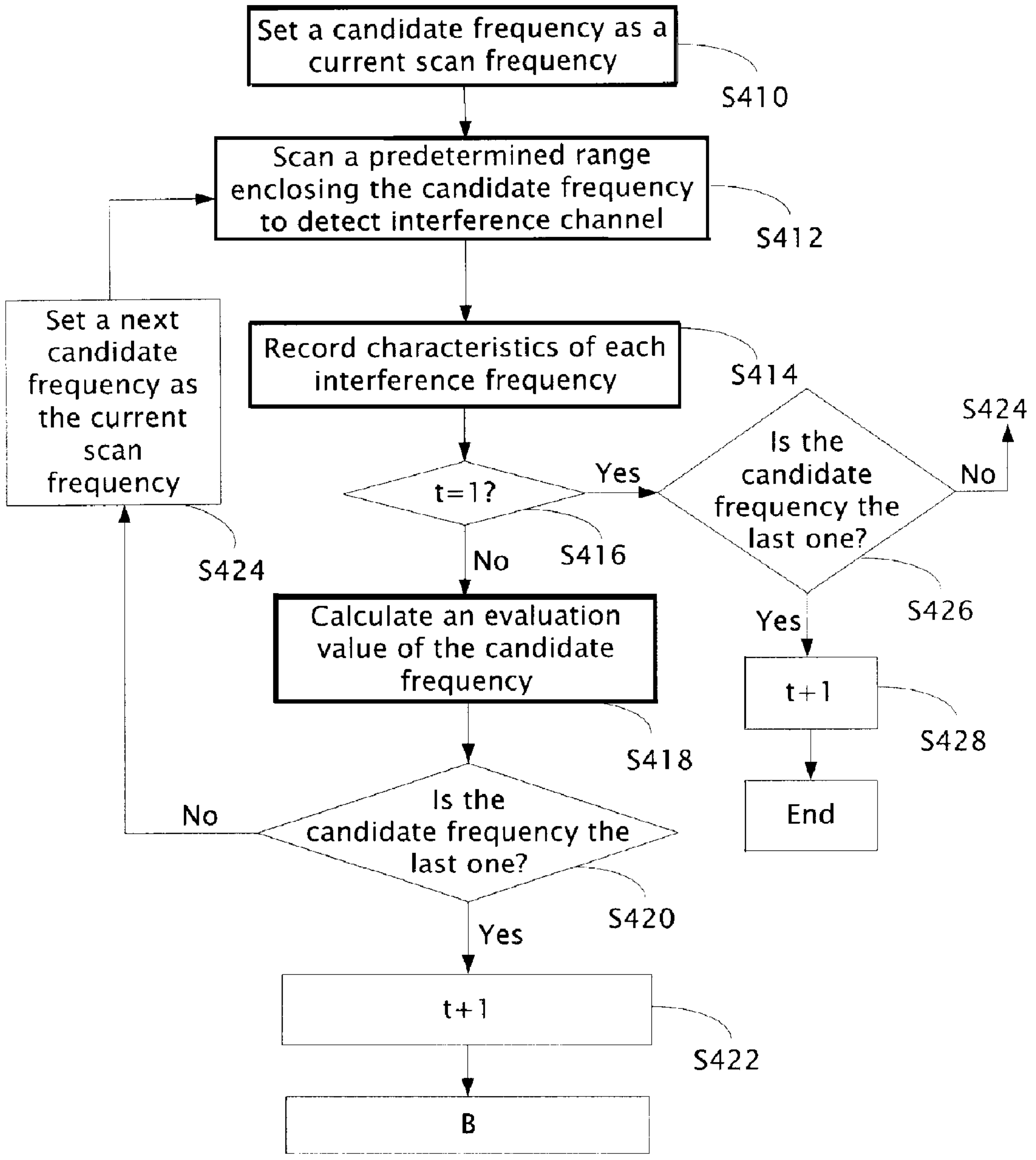
FIGS. 4 and 5 are a flowchart of a preferred method by utilizing the system of FIG. 1.
Figure 5:
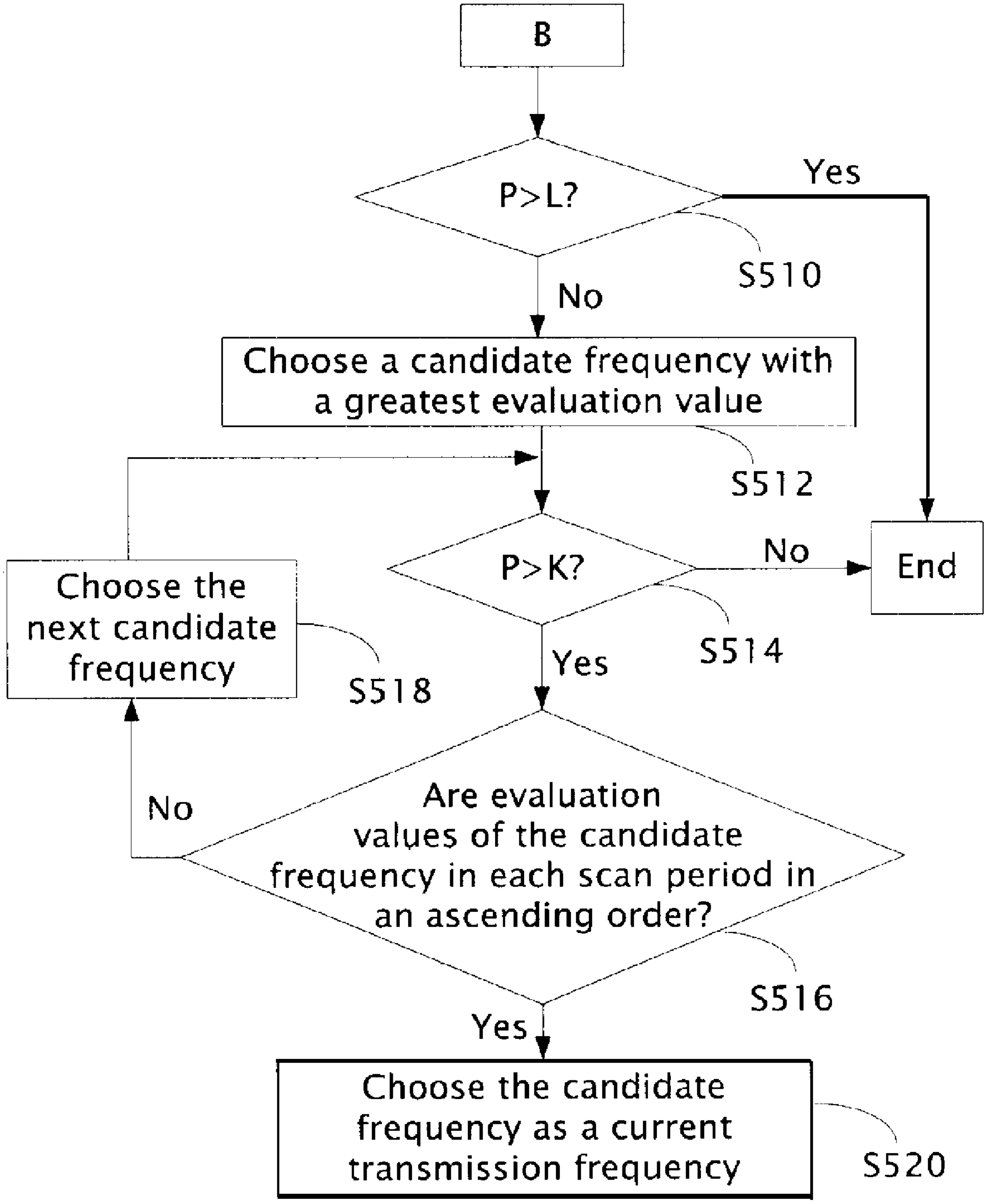

FIGS. 4 and 5 are flowcharts of a preferred method for automatically monitoring interference status of the candidate frequencies and choosing one of the candidate frequencies as an appropriate transmission frequency by utilizing the system of FIG. 1.

In step S410, the candidate frequency setting module 11 sets a candidate frequency $P_n$ as the current scan frequency. In step S412, the scan unit 18 scans a predetermined range enclosing the current scan frequency $P_n$ to detect interference frequencies $A_{n'}$. In step S414, the scan unit 18 stores characteristics of each interference frequency $A_{n'}$ in the storage unit 12. The characteristics of each interference frequency $A_{n'}$ includes a signal level $V_{n't}$ and a frequency thereof. In step S416, the CPU 11 analyzes whether the current scan period t is equal to one. If the current scan period t is not equal to one, the procedure goes to step S418 described below. Otherwise, the procedure goes to step S426 described below.

In step S418, the evaluation value calculating module 112 calculates an evaluation value $P_{nt}$ of the current scan frequency $P_n$. In step S420, the CPU 11 analyzes whether the current scan frequency $P_n$ is the last candidate frequency. If so, in step S422, the CPU 11 adds one to the current scan period t, whereupon the procedure goes to a procedure B in FIG. 5 described below. Otherwise, in step S424, the candidate frequency setting module 11 sets the next candidate frequency $P_n$ as the current scan frequency, whereupon the procedure returns to step S412 described above.

In step S426, the CPU 11 analyzes whether the current scan frequency $P_n$ is the last candidate frequency. If so, in step S428, the CPU 11 adds one to the current scan period t, the scan procedure is finished. Otherwise, the procedure goes to step S424 described above.

As shown in FIG. 5, in step S510, the frequency selection module 113 analyzes whether the evaluation value $P_{nt}$ of the preset transmission frequency $P_n$ is greater than a first predetermined value L. If so, the scan procedure is finished. Specifically, the current transmission frequency $P_n$ does not need changing, and the scan procedure will be performed in the next scan period. Otherwise, in step S512, the frequency selection module 113 chooses a candidate frequency $P_n$ with a greatest evaluation value from other candidate frequencies. In step S514, the frequency selection module 113 analyzes whether the evaluation value $P_{nt}$ of the candidate frequency $P_n$ is greater than a second predetermined value K.

If the evaluation value $P_{nt}$ is less than or equal to the second predetermined value K, the scan procedure is finished. Specifically, all candidate frequencies are improper, and the scan procedure will be performed in the next scan period. Otherwise, the frequency selection module 113 analyzes whether the evaluation values $P_{nt}$ of the candidate frequency $P_n$ in each scan period are in an ascending order according to scan records in the storage unit 12.

If the evaluation values $P_{nt}$ of the candidate frequency $P_n$ are in a descending order or in other orders, in step S518, the frequency selection module 113 chooses the next candidate frequency $P_n$ according to evaluation values arranged in an descending order, whereupon the procedure returns to step S514 described above. Otherwise, in step S520, the frequency selection module 113 chooses the candidate frequency as the current transmission frequency.

Although the present invention has been specifically described on the basis of the preferred embodiment including the preferred method, the invention is not to construed as being limited thereto. Various changes or modifications may be made to the embodiment including the method without departing from the scope and spirit of the invention.

What is claimed is:

1. A wireless transmission system comprising a wireless transmission apparatus for sending radio signals in a selected frequency and a wireless reception apparatus for receiving the radio signals in the selected frequency and playing audio signals corresponding to the radio signals, wherein:

the wireless transmission apparatus comprises:

a scan unit for periodically scanning interference frequencies of candidate frequencies which are selectable as a transmission frequency, and recording characteristics of each said interference frequency;

an evaluation value calculating module for calculating an evaluation value of each said candidate frequency according to the characteristics of the corresponding interference frequencies;

a frequency selection module for choosing one of the candidate frequencies as a current transmission frequency according to the evaluation values;

and a transmission unit for sending radio signals in the current transmission frequency;

wherein the characteristics of the interference frequency comprise a signal level and a frequency thereof, and the evaluation value calculating module calculates the evaluation value according to an equation $P=\Sigma Q=\Sigma((V_{n't}+\Delta V^2)/D^2)$, in which $V_{n't}$ represents a signal level of an n'th interference frequency in a current scan period t, ΔV represents a level difference between a signal level $V_{n't}$ in the current scan period t and a signal level $V_{n'(t-1)}$ in the immediately preceding scan period t−1, and D represents a frequency difference between the interference frequency and the candidate frequency.

2. The system according to claim 1, wherein the wireless transmission apparatus comprises a candidate frequency setting module for setting the candidate frequencies.

3. The system according to claim 1, wherein the frequency selection module chooses one of the candidate frequencies as the current transmission frequency if the evaluation value of the candidate frequency is less than or equal to a first predetermined value and greater than a second predetermined value, and the evaluation values of the candidate frequency in each scan period are in an ascending order.

4. A wireless transmission method comprising the steps of:

periodically scanning interference frequencies of candidate frequencies which are selectable as a transmission frequency, and recording characteristics of each said interference frequency;

calculating an evaluation value of each said candidate frequency according to the characteristics of corresponding interference frequencies;

choosing one of the candidate frequencies as a current transmission frequency according to the evaluation value; and sending radio signals in the current transmission frequency;

wherein the characteristics of the interference frequency comprise a signal level and a frequency thereof, and the evaluation value of each candidate frequency is calculated according to an equation $P=\Sigma Q=\Sigma((V_{n't}+\Delta V^2)/D^2)$, in which $V_{n't}$ represents a signal level of an n'th interference frequency in a current scan period t, ΔV represents a level difference between a signal level $V_{n't}$ in the current scan period t and a signal level $V_{n'(t-1)}$ in the immediately preceding scan period t−1, and D represents a frequency difference between the interference frequency and the candidate frequency.

5. The method according to claim 4, further comprising the step of setting one or more candidate frequencies.

6. The method according to claim 4, wherein one of the candidate frequencies is chosen as the current transmission frequency if the evaluation value of the candidate frequency is less than or equal to a first predetermined value, and greater than a second predetermined value, and the evaluation values of the candidate frequency in each scan period are in an ascending order.

7. An electronic entertainment device comprising:

a scan unit for periodically scanning interference frequencies of candidate frequencies which are selectable as a transmission frequency, and recording characteristics of each said interference frequency;

an evaluation value calculating module for calculating an evaluation value of each said candidate frequency according to the characteristics of the corresponding interference frequencies;

a frequency selection module for choosing one of the candidate frequencies as a current transmission frequency according to the evaluation values; and a transmission unit for sending radio signals in the transmission frequency;

wherein the characteristics of the interference frequency comprise a signal level and a frequency thereof, and the evaluation value calculating module calculates the evaluation value according to an equation $P=\Sigma Q=\Sigma((V_{n't}+\Delta V^2)/D^2)$, in which $V_{n't}$ represents a signal level of an n'th interference frequency in a current scan period t, ΔV represents a level difference between a signal level $V_{n't}$ in the current scan period t and a signal level $V_{n'(t-1)}$ in the immediately preceding scan period t−1, and D represents a frequency difference between the interference frequency and the candidate frequency.

8. The device according to claim 7, further comprising a candidate frequency setting module for setting the candidate frequencies.

9. The device according to claim 7, wherein the frequency selection module chooses one of the candidate frequencies as the current transmission frequency if the evaluation value of the candidate frequency is less than or equal to a first predetermined value, and greater than a second predetermined value, and the evaluation values of the candidate frequency in each scan period are in an ascending order.

* * * * *

UNITED STATES PATENT AND TRADEMARK OFFICE

CERTIFICATE OF CORRECTION

PATENT NO. : 7,650,118 B2
APPLICATION NO. : 11/309523
DATED : January 19, 2010
INVENTOR(S) : Hsieh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 758 days.

Signed and Sealed this

Twenty-third Day of November, 2010

David J. Kappos
*Director of the United States Patent and Trademark Office*